United States Patent [19]

Klebba et al.

[11] Patent Number: 4,695,920

[45] Date of Patent: Sep. 22, 1987

[54] ISOTHERMAL CAVITY AND SPARK GAP PROTECTION ASSEMBLY FOR INPUT/OUTPUT CONNECTION TERMINALS FOR ELECTRONIC MODULES

[75] Inventors: John M. Klebba, Golden; Kenneth L. Hultman, Louisville, both of Colo.

[73] Assignee: Geomation, Inc., Golden, Colo.

[21] Appl. No.: 896,628

[22] Filed: Aug. 14, 1986

[51] Int. Cl.[4] .............................................. H02H 3/20

[52] U.S. Cl. .................................... 361/118; 361/137; 361/415

[58] Field of Search ............... 361/112, 118, 119, 137, 361/413, 415

[56] References Cited

U.S. PATENT DOCUMENTS 4,160,210 7/1979 Molinari .......................... 361/119 X 4,454,566 6/1984 Cogne ............................ 361/415 X

FOREIGN PATENT DOCUMENTS

85/03602 8/1985 PCT Int'l Appl. ................ 361/112

*Primary Examiner*—A. D. Pellinen

*Assistant Examiner*—Derek S. Jennings

*Attorney, Agent, or Firm*—W. Scott Carson

[57] ABSTRACT

An apparatus for creating a isothermal cavity about the terminal pin connector panel of an input/output module and a spark gap of least impedance to earth ground potential at the terminal pins to protect the circuitry of the module. In the preferred embodiment, the structure forming the isothermal cavity and spark gap are functionally and physically interrelated into a simple and compact design easily receivable in a card cage format. The structure forming the isothermal cavity preferably surrounds all the sides of the terminal pin connector panel except the side providing access to the pin connectors. In this manner, free and continuous access to the pin connectors is maintained even while the module is in the card cage. Additionally, a puller section is incorporated into the apparatus for easy manipulation of the module.

45 Claims, 10 Drawing Figures

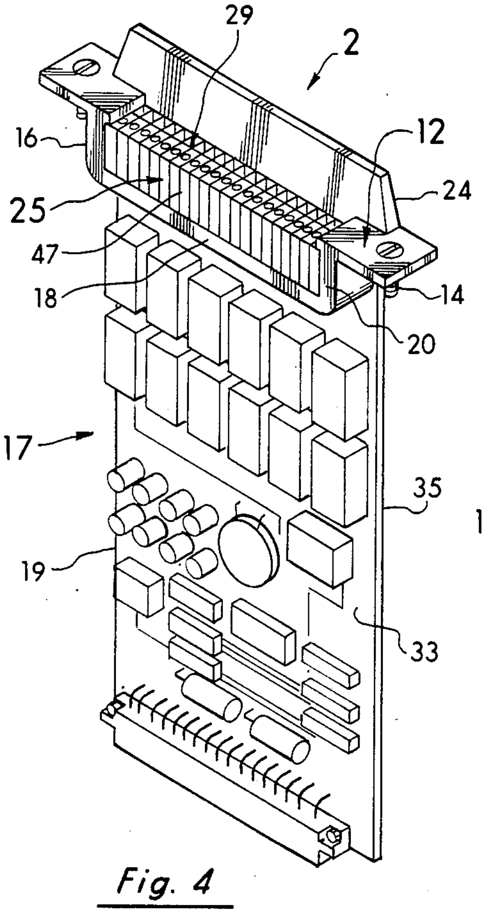
Fig. 4
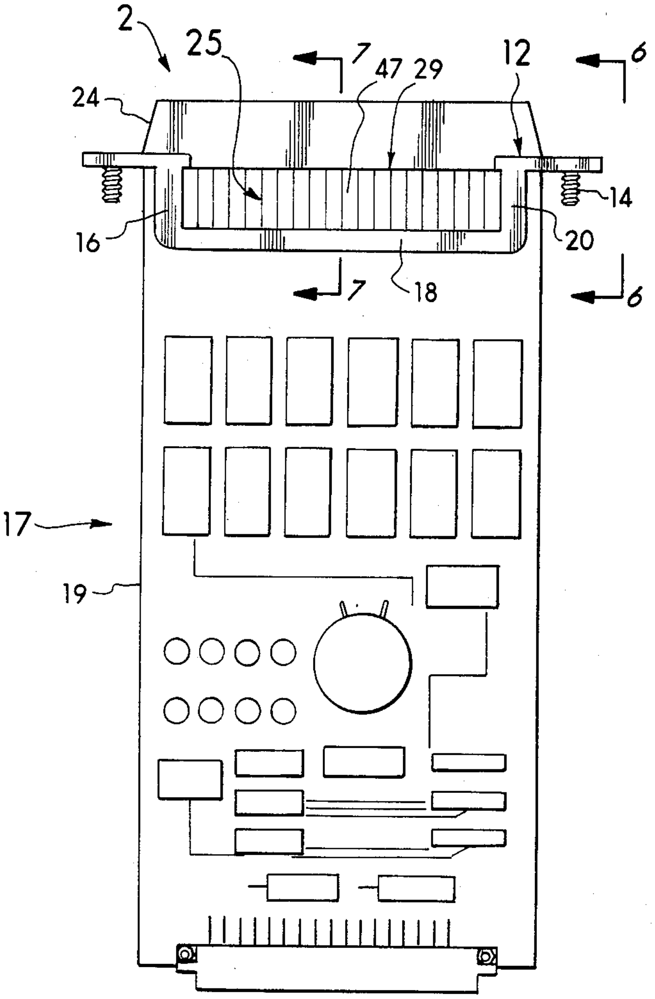
Fig. 5
Fig. 6
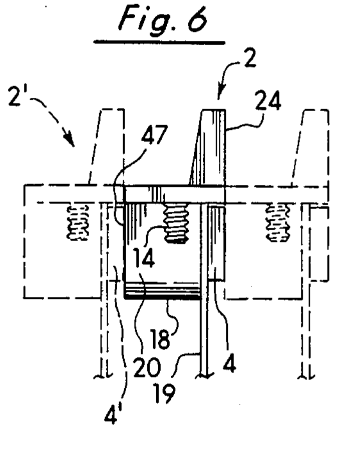
Fig. 7
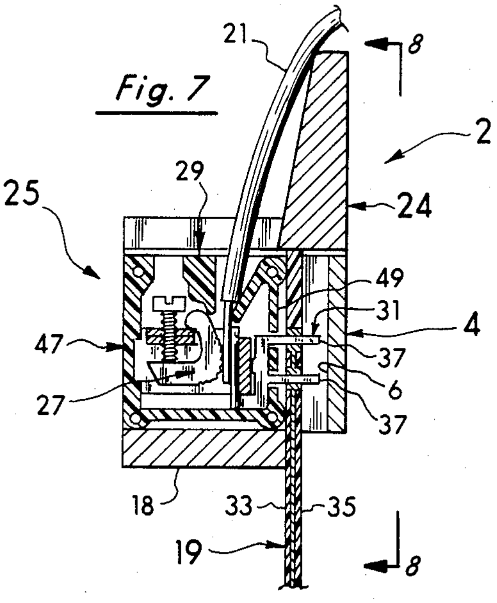

ISOTHERMAL CAVITY AND SPARK GAP PROTECTION ASSEMBLY FOR INPUT/OUTPUT CONNECTION TERMINALS FOR ELECTRONIC MODULES

BACKGROUND OF THE INVENTION

1. Field of the Invention

This invention relates to the field of automatic data collection in remote and harsh environments and more specifically to the field of providing a combined isothermal cavity and spark gap protection assembly for input/output connection terminals for electronic modules used in such data collection.

2. Background Discussion

Automatic data collection in remote and harsh environments presents several fundamental design problems that must be addressed from the outset. This is particularly true if low level measurements (e.g., micro-volt level) are going to be accurately made in locations where only limited power (e.g., one watt) is available. Principal among these problems in regard to the collection of low level measurements is eliminating spurious voltages at the terminal pin connections to the modules. Such spurious voltages can be due to any number of causes but one of the primary ones is temperature gradients across the terminal pin connector panel. At the micro-volt level, even the slightest temperature gradients can create sufficient therminal voltages and spurious signals to render impossible the direct connection of certain sensors such as thermocouple, strain gauge bridge, and low resistance devices. Presently, such data is either simply not collected or only collected where sufficient power is available to use amplifiers. However, even where sufficient power is available, the use of amplifier-per-channel in rugged and harsh environments often adds undesirable costs, weight, and complexity. Further, and perhaps more importantly, it can introduce significant errors in the low level measurements particularly where ambient conditions such as temperature may vary significantly and automatic calibration techniques using microprocessor control cannot be employed in a cost effective manner in amplifier-per channel systems.

In addition to eliminating thermal gradients across the terminal pin connector panel, another problem in the automatic collection of data in remote and harsh environments is protecting the module from high potential voltage surges in the signal lines. Such surges are simply unavoidable in most outdoor environments where they can be generated from a number of sources including lightning. Consequently, it is essential that the circuitry of the modules be protected from such high voltage surges.

With these problems in mind, the present invention was developed. With the present invention, low level measurements on the micro-volt level can be accurately and directly collected in remote and harsh environments using minimum power requirements on the order of one watt. In doing so, the invention presents a simple and compact arrangement for creating an isothermal cavity about the terminal pin connector panel. With this arrangement, spurious voltages due to thermal gradients across the panel have been essentially eliminated and direct measurement of multiplexing low level signals is now possible in the field with laboratory accuracy. Additionally, the present invention has incorporated a unique spark gap protection system into its design while maintaining the overall simplicity and compactness of the system.

SUMMARY OF THE INVENTION

This invention involves apparatus for creating an isothermal cavity about the terminal pin connector panel of an input/output module and a spark gap of least impedance to earth ground potential at the terminal pins to protect the circuitry of the module. In the preferred embodiment, the structure forming the isothermal cavity and spark gap are functionally and physically interrelated into a simple and compact design easily receivable in a card cage format. The structure forming the isothermal cavity preferably surrounds all the sides of the terminal pin connector panel except the side providing access to the pin connectors. In this manner, free and continuous access to the pin connectors is maintained even while the module is in the card cage. Additionally, a puller section is incorporated into the apparatus for easy manipulation of the module.

BRIEF DESCRIPTION OF THE DRAWINGS

FIG. 4 is a perspective view of an input/output module incorporating the present invention.

FIG. 5 is a front view of the module of FIG. 4.

FIG. 6 is a side view taken along line 6—6 of FIG. 5 illustrating the structure of the present invention. FIG. 6 also illustrates in dotted lines the cooperating relationship between adjacent modules incorporating the present invention.

FIG. 7 is an enlarged, cross-sectional view taken along line 7—7 of FIG. 5 illustrating the apparatus of the present invention in use with a typical wiring connector.

DETAILED DESCRIPTION OF THE PREFERRED EMBODIMENTS

Figure 1:
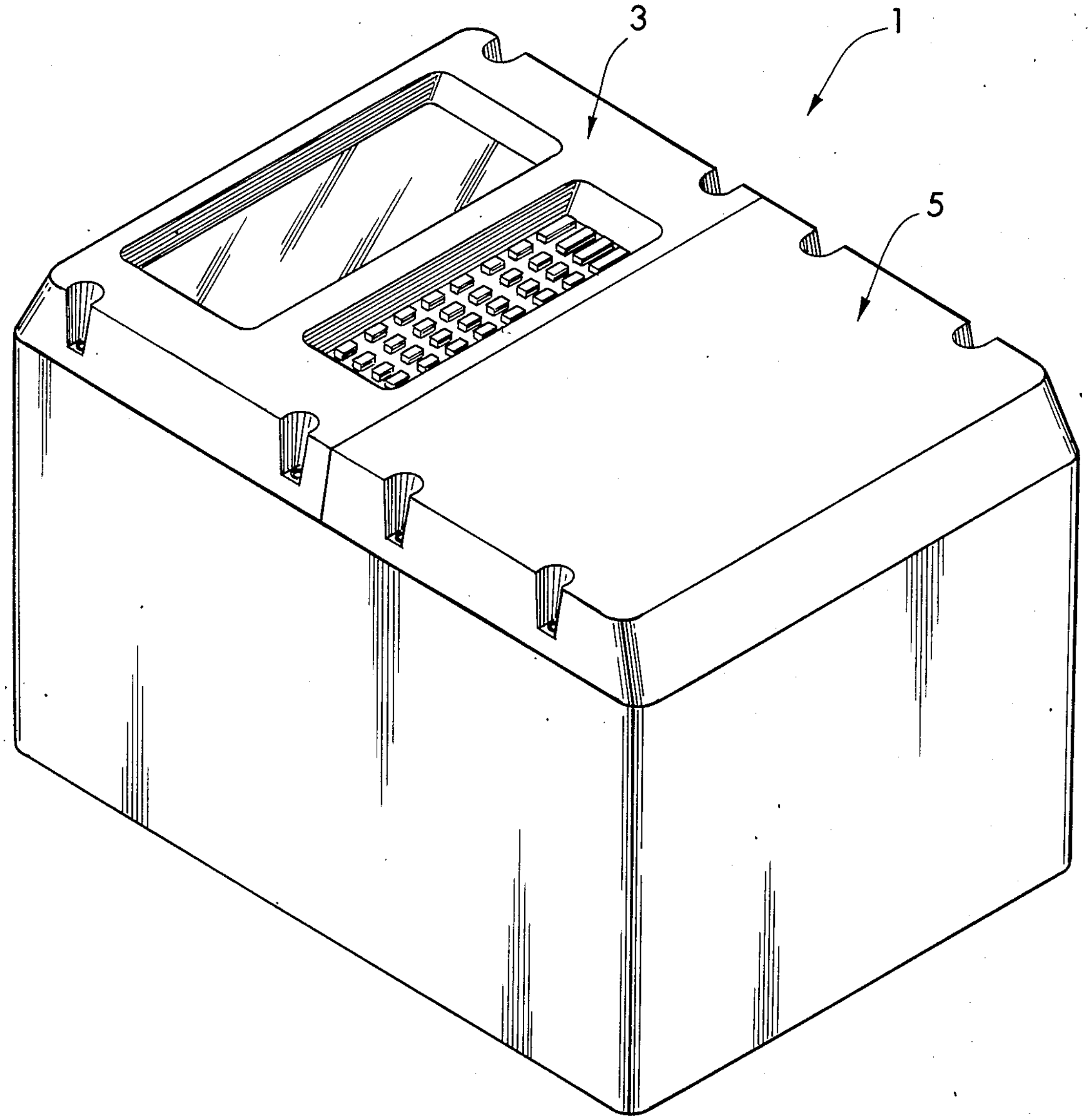
FIG. 1 is a perspective view of an automatic data collection unit.
Figure 2:
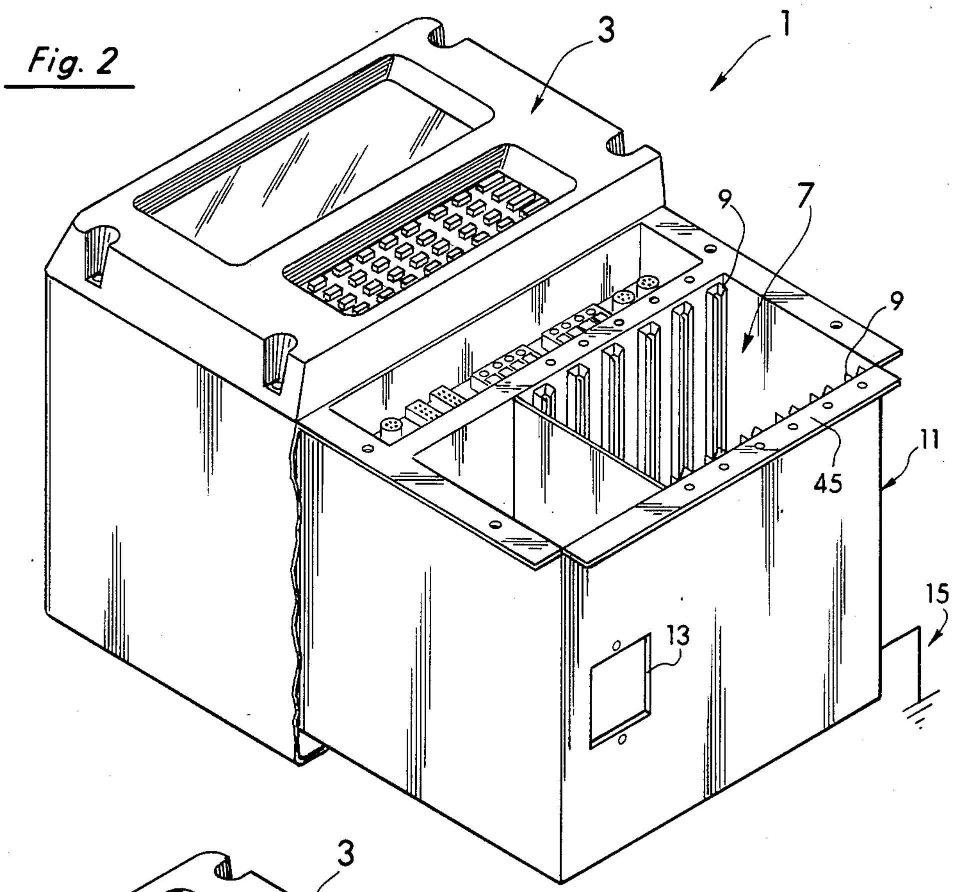
FIG. 2 is a view similar to FIG. 1 with the lower, cover panel removed to show the general layout configuration of the card cage area.
Figure 3:
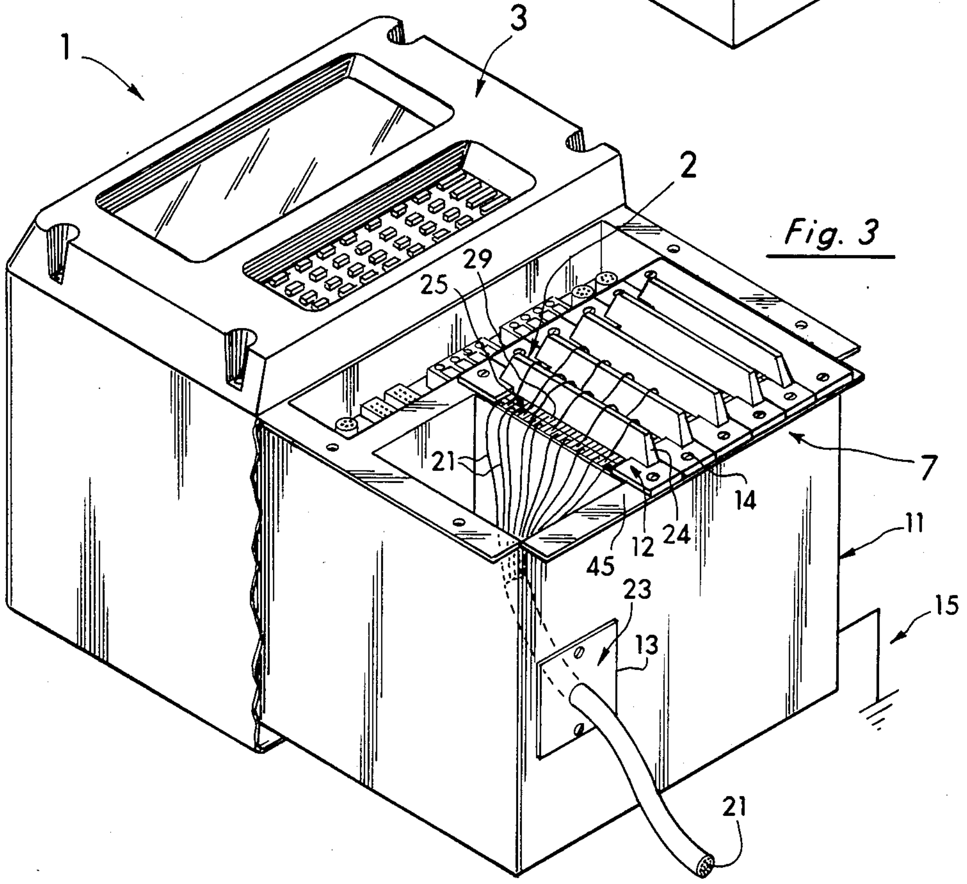
FIG. 3 is a view similar to FIG. 2 showing the apparatus of the present invention assembled into the card cage.
Figure 8:
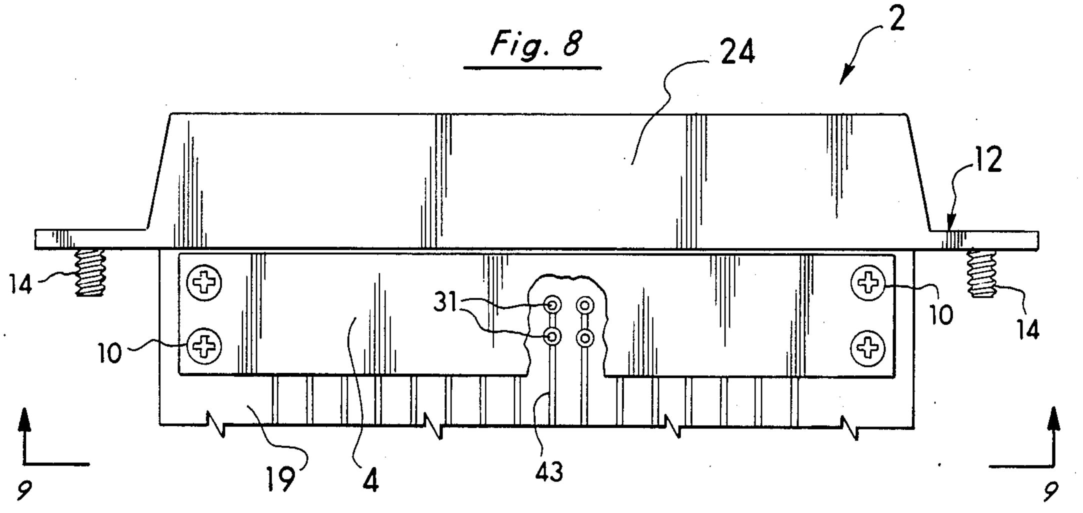
FIG. 8 is a rear view taken along line 8—8 of FIG. 7 illustrating a module incorporating the present invention.

FIGS. 1–3 illustrate an automatic data collection unit 1. As shown in FIG. 1, the unit 1 has a keyboard and display panel 3 and a lower, cover panel 5. Beneath the lower panel 5 (see FIG. 2) is a layout configuration incorporating a card cage 7 with card guides 9. The lower section 11 of the unit 1 in FIG. 2 is preferrably metallic with at least one wire access hole 13 and an earth ground 15. In use as illustrated in FIG. 3, input/output modules such as 17 shown in FIG. 4 are positioned within the card cage area 7 with the card members 19 of the modules 17 received in the card guides 9. Signal wires 21 from the monitored site (e.g., a dam) are then run through the access hole 13 and covering plate 23 and connected to the terminal pin connector panels 25 within the card cage area 7. The panels 25 can be of any conventional design and for illustrative purposes, they are shown as direct wire entry screw-clamp terminals (see FIG. 7) such as the Weidmuller TOP1.5GS Series. Such panels 25 are modular with a typical, assembled panel assuming a six-sided, rectiloidal shape with direct access to the wire connections 27 (see FIG. 7) being through the upper side 29.

In prior art approaches, terminal pin connector panels such as 25 are simply assembled on each card member 19 with the input/output pins 31 (see FIG. 7) extending away from the main body of the panel 25 and through the card member 19 from one side 33 to the other side 35. In such prior art approaches, the panels 25 are completely exposed to ambient conditions including convection currents. Under such conditions, the panels 25 commonly develop temperature gradients across them that can create thermal voltages on an order that renders accurate and direct measurement of low level signals (e.g., micro-volt level) virtually impossible. Additionally, such prior art approaches offer no truly effective integrated protection of comparable simplicity from high voltage surges in the signal lines 21 that can damage the delicate circuitry on the printed circuit boards of the modules 17. Such protection is particularly important in the collection of low level measurements in rugged and harsh environments such as may be encountered at outside locations where surges from any number of sources including lightning are simply unavoidable.

Figure 9:
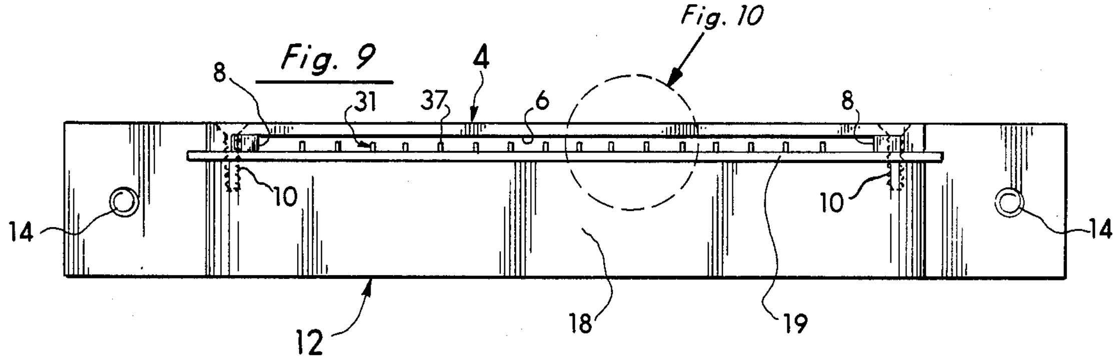
FIG. 9 is a view taken along line 9—9 of FIG. 8 illustrating the spark gap protection assembly of the present invention.
Figure 10:
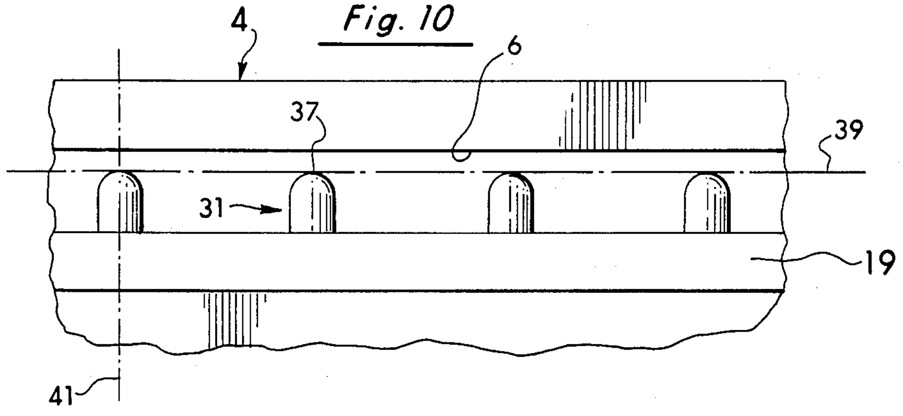
FIG. 10 is an enlarged view of the area indicated in FIG. 9 illustrating the spark gap protection assembly of the present invention.

In contrast to these prior art approaches, the apparatus 2 of the present invention creates an isothermal cavity about the panel 25 of each input/output module 17 and additionally provides a spark gap protection assembly. The spark gap protection assembly includes the member 4 (see FIGS. 6–10) which has a planar surface 6 positioned by spacing portions 8 (see FIG. 9) immediately adjacent the free standing ends 37 of the terminal pins 31. As best seen in FIG. 10, the free standing ends 37 of the terminal pins 31 are substantially coplanar in a common plane 39 which is substantially perpendicular to the axes 41 of the terminal pins 31. The planar surface 6 of the member 4 (see FIGS. 7 and 10) is then positioned substantially parallel to this common plane 39 and spaced from it on the order of 0.02 inches creating a spark gap therebetween. Additionally, the portions 8 have an opening therebetween extending substantially across the card member to prevent any unwanted arcing between the circuitry on card member 19 and member 4. This spacing also permits visual inspection of the spark gaps at each pin 31 when viewed as in FIGS. 9 and 10.

As best seen in FIGS. 4, 5, and 7, the card member 19 has upper and lower end portions spaced from each other along a vertical axis. Each card member 19 together with the printed circuit thereon forms a printed circuit board wherein the terminal pins 31 are electrically connected to portions such as 43 of the printed circuit (see FIG. 8). The card member 19 of the printed circuit board is substantially planar and its central plane is substantially perpendicular to the pin axes 41 in FIG. 10 and substantially parallel to the plane 39 and planar surface 6.

The member 4 of the spark gap protection assembly is fixedly secured by screws 10 (see FIG. 9) to the member 12 which in turn is fixedly secured by screws 14 (see FIG. 3) to the flanges 45 of the card cage 7. The members 4 and 12, screws 10 and 14, and card cage 7 are all preferably metallic. Further, the spark gap across each terminal pin 31 to the plane surface 6 of member 4 is specifically designed to offer the path of least impedance to ground 15 in all directions to spurious and potentially dangerous high voltage surges in the pins 31. In this manner, any such surges above a predetermined amount (e.g., 2500 volts) that are potentially dangerous to the circuitry of the module 17 will be safely and efficiently discharged to the member 4 and through the card cage 7 to the earth ground 15 (see FIG. 3).

The isothermal portion of the apparatus 2 is primarily concerned with two modes of energy transfer adjacent the panel 25 (i.e., convection and radiation). In regard to the first mode of convection, the isothermal portion includes member 12 which has sides 16, 18, and 20 substantially abutting corresponding sides of the panel 25 (see FIGS. 4 and 5). Additionally, the member 4′ of the adjacent apparatus 2′ (see FIG. 6) substantially abuts the side 47 of the panel 25. In this manner and with the backside 49 of the panel 25 abutting side 33 of the card member 19 (see FIG. 7), the main body of the panel 25 is substantially shielded from any convection currents which might tend to develop thermal gradients and thermal voltages across it. Further, the member 4 is positioned adjacent the free standing ends 37 of the pins 31 passing through the card member 19 wherein the entire panel 25 including its main body and pins 31 are substantially shieled from any convection currents. Yet, in doing so, free and unhibited access to the wire connections 27 through the front side 29 of the panel 25 is maintained and wiring connections can be made without removing the card member 19 from the card cage 7.

In regard to the second mode of energy transfer (i.e., radiation), the member 12 of the apparatus 2 preferably approaches a perfect black body radiator (e.g., aluminum with a chemical film coating of high spectral emissivity). In doing so, member 12 freely transmits and absorbs radiation to and from the panel 25 to maintain a common temperature therewith. The member 4 of the spark gap protection system is preferably also of the same material. In this light and in the assembled position of 6–9, the member 4 additionally forms part of the isothermal means for radiant energy as it is positioned adjacent the backside 49 of the panel 25. The members 4 and 12 of the apparatus 2 are thus positioned adjacent four of the six sides of the panel 25. Then, in a manner similar to the convection mode, the member 4′ of the neighboring apparatus 2′ (see FIG. 6) is positioned adjacent a fifth side 47 of the panel 25 wherein all sides but the front access side 29 of the panel 25 are covered.

The apparatus 2 further includes a puller section 24 which is preferably an integral extension of the isothermal member 12. The puller section 24 is substantially planar and extends away from the upper end portion of the card member 19 with the planes of the puller section 24 and the card member 19 substantially parallel to each other (i.e., both planes are substantially vertical in FIGS. 6 and 7). Additionally, the central plane of the puller section 24 is substantially coplanar with the surface plane 6 of the spark gap member 4. In use, the members 4 and 12 are fixedly secured to each other by screws 10 with the card member 19 sandwiched inbetween wherein the puller section 24 can then be easily gripped to manipulate the members 4, 12, and 19 as an integral unit. Further, the screws 14 serve to hold this unit securely in place in the card cage 7 which is important particularly in maintaining reliability in high vibration environments such as shipboard and pipeline stations.

In use, the apparatus 2 of the present invention will create an isothermal cavity about the terminal pin connector panel 25 and a spark gap of least impedance to ground 15 at each pin 31. To assemble the apparatus 2 on the printed circuit board of the input/output module 17, the panel 25 is first placed adjacent the upper end portion of the card member 19 with the terminal pins 31 extending through the card member 19 and electrically connected to the portions 43 of the printed circuit (see FIGS. 7 and 8). In this position the substantially planar, front side 29 of the panel faces upwardly away from the lower end portion of the card member 19 and the plane of the side 29 is substantially perpendicular to the central plane of the card member 19. The members 4 and 12 are then assembled on either side of the card member 19 and secured to each other by screws 10 with the card member 19 sandwiched therebetween. Thereafter and by gripping the puller section 24 of the apparatus 2, the card member 19 can be manipulated into the card cage area 7 and the member 12 fixed by screws 14 to flanges 43 of the card cage 7. The members 4 and 12, screws 10 and 14, and card cage 7 are all preferably metallic with high thermal and electrical conducting properties. Consequently, should a high voltage surge appear in the line 21 of FIGS. 7, it will arc across the path of least impedance from pin 31 to the planar surface 6 of the member 4 and pass harmlessly through screws 10 to member 12 and on through members 14 and 7 to the ground 15. Additionally, the apparatus 2 will form an isothermal cavity about the panel 25 substantially eliminating any thermal gradient across the panel 25. In doing so, the apparatus 2 not only prevents the passage of convection currents by the panel 25 but also due to its black body characteristics, it will further serve to maintain the panel 25 at a common temperature with the thermal mass of member 12 and card cage 7.

While several embodiments of the present invention have been shown and described in detail, it is to be understood that changes and modifications may be made to them without departing from the scope of the invention.

We claim:

1. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, each of said pins having a free standing end spaced from the plane of said card member, the improvement comprising apparatus for forming an isothermal cavity about said panel and a spark gap of least impedance at the free standing end of each pin, said apparatus including:

isothermal means substantially surrounding said panel to create an isothermal cavity about said panel, said isothermal means having high thermal conducting properties and having a portion thereof positioned immediately adjacent said panel in substantially an abutting relationship therewith, said portion further being positioned substantially between said panel and the second end portion of said card member and spark gap means positioned adjacent the free standing ends of said pins to present a path of least impedance between each of said pins and said spark gap means for discharging any high potential voltages in each pin above a predetermined amount.

2. The apparatus of claim 1 wherein said spark gap means includes a member having a substantially planar surface and means for positioning said planar surface adjacent the free standing ends of said pins.

3. The apparatus of claim 2 wherein the planes of said planar card member and said planar surface of said spark gap means are substantially parallel.

4. The apparatus of claim 2 wherein the free standing ends of said pins are substantially coplanar in a common plane substantially perpendicular to the pin axes and spaced from said planar surface of said spark gap means.

5. The apparatus of claim 4 wherein said planar surface is spaced about 0.02 inches from said common plane at substantially every pin.

6. The apparatus of claim 5 wherein the predetermined amount of high potential voltage is about 2500 volts.

7. The apparatus of claim 2 further including a card cage for receiving said card member, means for electrically grounding said card cage, and means for electrically connecting said planar surface of said spark gap means to said card cage wherein any high potential voltages discharged to said planar surfaces pass through said card cage to said ground.

8. The apparatus of claim 2 wherein said positioning means includes means for fixedly securing said planar surface and said card member to said isothermal means wherein said planar surface, card member, and isothermal means can be manipulated as a integral unit.

9. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, each of said pins having a free standing end spaced from the plane of said card member, the improvement comprising apparatus for forming an isothermal cavity about said panel and a spark gap of least impedance at the free standing end of each pin, said apparatus including:

isothermal means substantially surrounding said panel to create an isothermal cavity about said panel and spark gap means positioned adjacent the free standing ends of said pins to present a path of least impedance between each of said pins and said spark gap means for discharging any high potential voltages in each pin above a predetermined amount, said spark gap means including a member having a substantially planar surface and means for positioning said planar surface adjacent the free standing ends of said pins wherein the free standing ends of said pins are substantially coplanar in a common plane substantially perpendicular to the pin axes and spaced from said planar surface of said spark gap means, said means for positioning said planar surface having an opening extending substantially across said card member adjacent said first end portion thereof wherein the spacing between said free standing ends of said pins and said planar surface of said spark gap means is visible and can be visually inspected by viewing along said card member from said second end portion thereof toward said first end portion thereof.

10. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, each of said pins having a free standing end spaced from the plane of said card member, the improvement comprising apparatus for forming an isothermal cavity about said panel and a spark gap of least impedance at the free standing end of each pin, said apparatus including:

isothermal means substantially surrounding said panel to create an isothermal cavity about said panel and spark gap means positioned adjacent the free standing ends of said pins to present a path of least impedance between each of said pins and said spark gap means for discharging any high potential voltages in each pin above a predetermined amount, said spark gap means including a member having a substantially planar surface and means for positioning said planar surface adjacent the free standing ends of said pins wherein said card member has first and second sides, the panel has a main body and said pins extend away from said main body and through said card member from the first side to the second side with said main body positioned adjacent said first side and said planar surface of said spark gap means is positioned adjacent the second side of said card member wherein the main body of said panel and said planar surface are on opposite sides of said card member.

11. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, each of said pins having a free standing end spaced from the plane of said card member, the improvement comprising apparatus for forming an isothermal cavity about said panel and a spark gap of least impedance at the free standing end of each pin, said apparatus including:

isothermal means substantially surrounding said panel to create an isothermal cavity about said panel wherein said terminal pin connector panel has a plurality of sides and a plurality of wire connectors electrically connected to said pins and accessible from one side of said panel, said isothermal means having an opening therein adjacent said one side of said panel to provide access to said wire connectors and spark gap means positioned adjacent the free standing ends of said pins to present a path of least impedance between each of said pins and said spark gap means for discharging any high potential voltages in each pin above a predetermined amount.

12. The apparatus of claim 11 wherein said one side of said panel faces substantially away from the second end portion of said card member.

13. The apparatus of claim 12 wherein said one side of said panel is substantially planar and substantially perpendicular to the plane of said card member.

14. The apparatus of claim 11 wherein said isothermal means surrounds substantially all of the sides of said panel other than said one side.

15. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, each of said pins having a free standing end spaced from the plane of said card member, the improvement comprising apparatus for forming an isothermal cavity about said panel and a spark gap of least impedance at the free standing end of each pin, said apparatus including:

isothermal means substantially surrounding said panel to create an isothermal cavity about said panel wherein said isothermal means further includes a puller section adjacent said panel and adjacent to and extending away from the first end portion of said card member wherein said puller section can be gripped to manipulate said card member and spark gap means positioned adjacent the free standing ends of said pins to present a path of least impedance between each of said pins and said spark gap means for discharging any high potential voltages in each pin above a predetermined amount.

16. The apparatus of claim 15 wherein the puller section is substantially planar and extends substantially parallel to the plane of said card member.

17. The apparatus of claim 16 wherein said spark gap means includes a member having a substantially planar surface and means for positioning said planar surface adjacent the free standing ends of said pins with the planes of said planar surface and said puller section substantially parallel.

18. The apparatus of claim 17 wherein the planes of said planar surface and said puller section are substantially coplanar.

19. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, each of said pins having a free standing end spaced from the plane of said card member, the improvement comprising apparatus for forming an isothermal cavity about said panel and a spark gap of least impedance at the free standing end of each pin, said apparatus including:

isothermal means substantially surrounding said panel to create an isothermal cavity about said panel wherein said isothermal means includes means for substantially preventing any passage of convention currents adjacent the terminal pin connector panel and spark gap means positioned adjacent the free standing ends of said pins to present a path of least impedance between each of said pins and said spark gap means for discharging any high potential voltages in each pin above a predetermined amount.

20. The apparatus of claim 19 wherein said panel has a number of sides with one of said sides positioned adjacent said card member and said preventing means substantially abutting a plurality of the remaining sides.

21. The apparatus of claim 20 wherein said panel has six sides with said one side thereof positioned adjacent said card member and said preventing means substantially abutting at least three of the remaining sides.

22. The apparatus of claim 21 wherein said preventing means substantially abuts at least four of the remaining sides and said card member and said preventing means substantially shield said panel from convention currents.

23. The apparatus of claim 22 further including a second printed circuit board, terminal pin connector panel, and spark gap means substantially identical to the first mentioned ones and means to position said second spark gap means in a substantially abutting position with one of said at least four of the remaining sides of the first mentioned panel wherein said second spark means forms part of the preventing means for said first mentioned panel.

24. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, each of said pins having a free standing end spaced from the plane of said card member, the improvement comprising apparatus for forming an isothermal cavity about said panel and a spark gap of least impedance at the free standing end of each pin, said apparatus including:

isothermal means substantially surrounding said panel to create an isothermal cavity about said panel wherein said isothermal means includes black body radiator means substantially surrounding said panel for transmitting and absorbing radiation to and from said panel to maintain a common temperature therewith and spark gap means positioned adjacent the free standing ends of said pins to present a path of least impedance between each of said pins and said spark gap means for discharging any high potential voltages in each pin above a predetermined amount.

25. The apparatus of claim 24 wherein said panel has a number of sides and said black body radiator means being positioned adjacent a plurality of said sides.

26. The apparatus of claim 25 wherein said panel has six sides and said black body radiator means being positioned adjacent at least four of said sides.

27. The apparatus of claim 26 wherein said black body radiator means is positioned adjacent at least five of said sides.

28. The apparatus of claim 26 wherein said spark gap means forms part of said black body radiator means and is positioned adjacent one side of said panel.

29. The apparatus of claim 26 further including a second printed circuit board, terminal pin connector panel, and spark gap means substantially identical to the first mentioned ones and means to position said second spark gap means substantially adjacent one of said at least four sides of the first mentioned panel wherein said second spark gap means forms part of the black body radiator means for said first mentioned panel.

30. The apparatus of claim 24 further including a card cage for receiving said card member, and said black body radiator means being thermally connected to said card cage whereby said panel is maintained by said block body means at a common temperature with said card cage.

31. In combination with a (Apparatus for use in connection with a printed circuit board and terminal pin connector panel to form an isothermal cavity about said panel and a spark gap of least impedance at each pin, said) printed circuit board having a substantially planar, card member with first and second end portions spaced from each other along a first axis and with a printed circuit thereon, (said) and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, each of said pins having a free standing end spaced from the plane of said card member, the improvement comprising (said) apparatus for forming an isothermal cavity about said panel and a spark gap of least impedance at the free standing end of each pin including:

isothermal means substantially surrounding said panel to create an isothermal cavity about said panel, said isothermal means having high thermal conducting properties and having a portion thereof positioned immediately adjacent said panel in substantially an abutting relationship therewith, said portion further being positioned substantially between said panel and the second end portion of said card member.

32. The apparatus of claim 31 wherein said panel has a number of sides and said isothermal means is positioned adjacent a plurality of said sides.

33. The apparatus of claim 31 further including a card cage for receiving said card member, said isothermal means being thermally connected to said card cage whereby said panel is maintained by said isothermal means at a common temperature with said card cage.

34. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, the improvement comprising apparatus for forming an isothermal cavity about said panel, said apparatus including:

isothermal means substantially surrounding said panel to create an isothermal cavity about said panel wherein said terminal pin connector panel has a number of sides and a plurality of wire connectors electrically connected to said pins and accessible from one side of said panel, said isothermal means having an opening therein adjacent said one side of said panel to provide access to said wire connectors.

35. The apparatus of claim 34 wherein said one side of said panel faces substantially away from the second end portion of said card member.

36. The apparatus of claim 35 wherein said one side of said panel is substantially planar and substantially perpendicular to the plane of said card member.

37. The apparatus of claim 34 wherein said isothermal means is positioned adjacent a plurality of said sides.

38. The apparatus of claim 34 wherein said isothermal means surrounds substantially all of the sides of said panel other than said one side.

39. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, the improvement comprising apparatus for forming an isothermal cavity about said panel, said apparatus including:

isothermal means substantially surrounding said panel to create an isothermal cavity about said panel wherein said isothermal means further includes a substantially planar, puller section extending away from the first end portion of said card member with the plane of said puller section substantially parallel to the plane of said card member wherein said puller section can be gripped to manipulate said card member.

40. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, the improvement comprising apparatus for forming an isothermal cavity about said panel, said apparatus including:

isothermal means substantially surrounding said panel to create an isothermal cavity about said panel wherein said panel has a plurality of sides and said combination further includes a second printed circuit board, terminal pin connector panel, and isothermal means substantially identical to the first mentioned ones and means to position a portion of said second isothermal means substantially adjacent one of said sides of the first mentioned panel wherein said portion of said second isothermal means forms part of the isothermal means for said first mentioned panel.

41. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, the improvement comprising apparatus for forming an isothermal cavity about said panel, said apparatus including:

isothermal means substantially surrounding said panel to create an isothermal cavity about said panel wherein said isothermal means includes means for substantially preventing any passage of convection currents adjacent the terminal pin connector panel.

42. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, the improvement comprising apparatus for forming an isothermal cavity about said panel, said apparatus including:

isothermal means substantially surrounding said panel to create an isothermal cavity about said panel wherein said isothermal means includes black body radiator means substantially surrounding said panel for transmitting and absorbing radiation to and from said panel to maintain a common temperature therewith.

43. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, each of said pins having a free standing end spaced from the plane of said card member, the improvement comprising apparatus for forming a spark gap of least resistance at each pin, said apparatus including:

spark gap means positioned adjacent the free standing ends of said pins to present a path of least impedance between each of said pins and said spark gap means for discharging any high potential voltages in each pin above a predetermined amount wherein the free standing ends of said pins are substantially coplanar in a common plane substantially perpendicular to the pin axes and said spark gap means includes a member having a substantially planar surface and means for positioning said planar surface adjacent to and spaced from the free standing ends of said pins.

44. The apparatus of claim 43 wherein said means for positioning said planar surface has an opening extending substantially across said card member adjacent said first end portion thereof wherein the spacing between said free standing ends of said pins and said planar surface of said spark gap means is visible and can be visually inspected by viewing along said card member from said second end portion thereof toward said first end portion thereof.

45. In combination with a printed circuit board having a substantially planar, card member with first and second end portions spaced from each other along a first axis and with a printed circuit thereon, and a terminal pin connector panel having a plurality of input and output pins extending along respective axes, said panel being positioned adjacent the first end portion of said card member with the pins of the panel electrically connected to portions of said printed circuit and the respective pin axes substantially perpendicular to the plane of said card member, each of said pins having a free standing end spaced from the plane of said card member, the improvement comprising apparatus for forming a spark gap of least resistance at each pin, said apparatus including:

spark gap means positioned adjacent the free standing ends of said pins to present a path of least impedance between each of said pins and said spark gap means for discharging any high potential voltages in each pin above a predetermined amount wherein said card member has first and second sides, the panel has a main body and said pins extend away from said main body and through said card member from the first side to the second side with said main body positioned adjacent said first side and said planar surface of said spark gap means is positioned adjacent the second side of said card member wherein the main body of said panel and said planar surface are on opposite sides of said card member.

* * * * *